United States Patent [19]

Childs

[11] Patent Number: 5,662,068

[45] Date of Patent: Sep. 2, 1997

[54] ANIMAL STALL CLEANING DEVICE

[76] Inventor: Raymond Childs, 2632 Rt. 322 East, Orwell, Ohio 44076

[21] Appl. No.: 578,468

[22] Filed: Dec. 26, 1995

[51] Int. Cl.$^6$ .................................................. A01K 31/04
[52] U.S. Cl. ............................................................ 119/451
[58] Field of Search .................................... 119/416, 432, 119/436, 439, 442, 447, 450, 451, 458, 479, 517, 527; 198/468.9, 476.1, 750.1

[56] References Cited

U.S. PATENT DOCUMENTS

| | | | |
|---|---|---|---|
| 1,582,411 | 4/1926 | Lesser et al. | 198/750.1 |
| 1,807,932 | 6/1931 | Rainwater | 119/442 |
| 2,186,120 | 1/1940 | Oser | 119/458 |
| 2,591,643 | 4/1952 | Volmer . | |
| 3,464,389 | 9/1969 | Seiderman | 119/458 |
| 3,498,482 | 3/1970 | Lewis | 198/750.1 |
| 3,530,832 | 9/1970 | De Satnick . | |
| 3,552,542 | 1/1971 | Comber . | |
| 4,148,276 | 4/1979 | Schmidt | 119/458 X |
| 4,243,137 | 1/1981 | Laurenz . | |

*Primary Examiner*—Thomas Price
*Attorney, Agent, or Firm*—Harpman & Harpman

[57] ABSTRACT

An apparatus for use in removing manure and bedding from animal stalls especially in horse barns comprising a movable floor engagement belt that is adapted to be pulled along the floor in one direction transporting accumulated debris out of the barn and in the opposite direction to reposition across the floor of the multiple stalls.

13 Claims, 5 Drawing Sheets

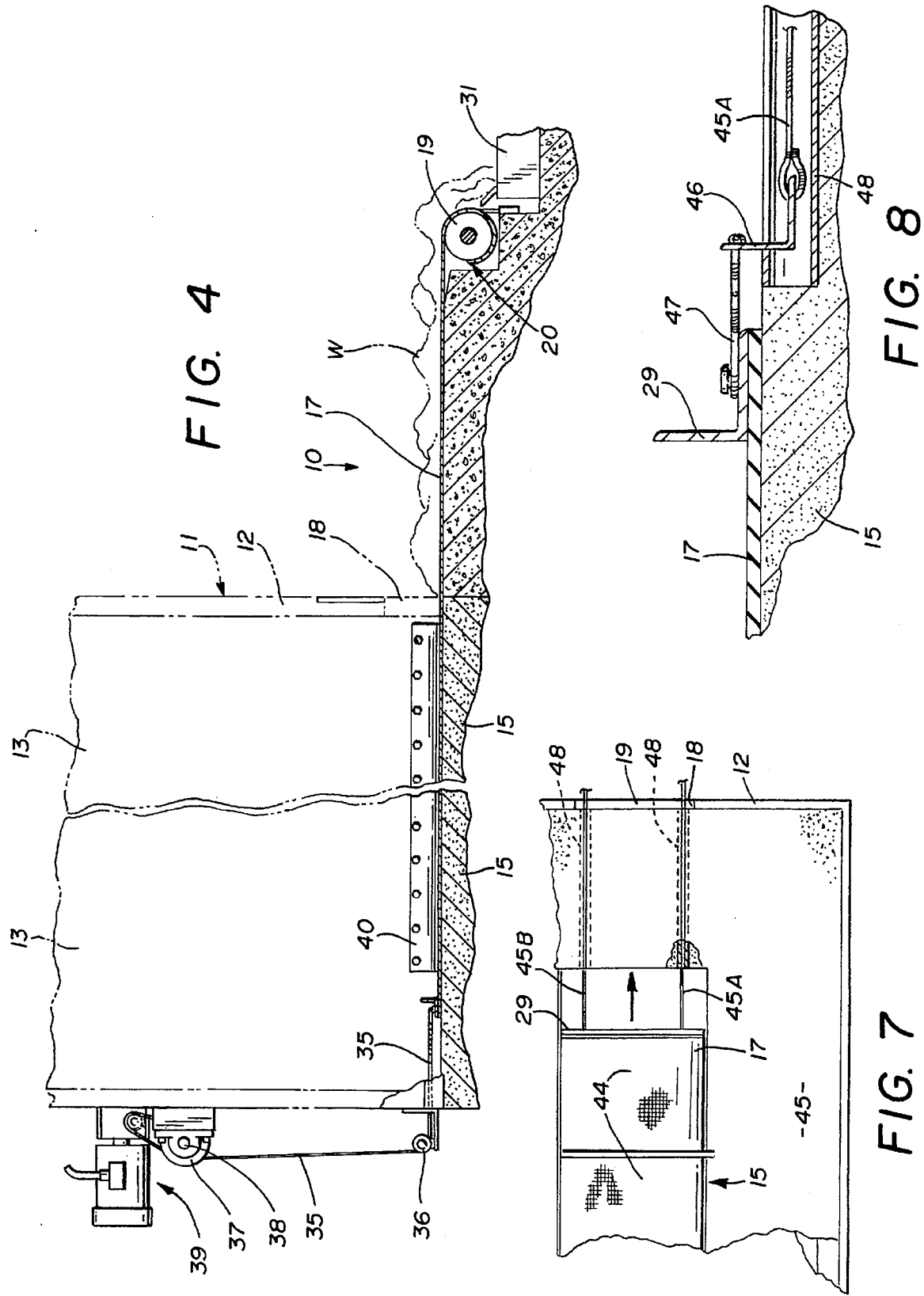

5,662,068

ANIMAL STALL CLEANING DEVICE

BACKGROUND OF THE INVENTION

1. Technical Field

This device relates to conveyor belts and transportation systems used to remove animal wastes from building structures and the like.

2. Description of Prior Art

Many of the device heretofore used or disclosed are directed to the transport and collection of animal waste in a trough or recessed area by use of a continuous conveyor belt system. Other systems utilize scrapper apparatus that is dragged across the floor in one direction to scoop and remove debris and then return for next use, see for example U.S. Pat. Nos. 2,591,643, 4,243,137, 3,530,832, 3,552,542.

In U.S. Pat. No. 2,591,643 a fertilizer spreader for barns and the like is disclosed having elongated trough extending through the barn with a conveyor belt within to collect and transport waste accumulated within the trough.

U.S. Pat. No. 4,243,137 is directed to a barn or pit floor scrapper that is mechanically pulled across the barn floor scrapping waste material before it.

In U.S. Pat. No. 3,530,832 an apparatus for removing manure from buildings is disclosed having manure collecting channels which are cleaned by a pulley scrapper device that extends through the channels.

U.S. Pat. No. 3,552,542 claims a pit cleaner and elevator for animal houses in which a plurality of scrapper blades are secured to an endless belt within a waste accumulation removal pit.

The present invention is directed towards application in horse stalls specifically in which one of the critical aspects of a horse stall is the flooring material which is ideally a mixture of sand and clay to provide a soft somewhat compressible material under hoof. In accordance with the present invention a wide belt of resilient material covers the floor area of the horse stalls on which the animals walk. Straw is normally positioned within the stall on the floor and must be removed along with animal manure. By retracting the movable floor belt onto a powered roll the straw and waste material can be removed in one simple and quick operation from the barn.

SUMMARY OF THE INVENTION

A waste removal system for horse barns and the like having a belt of resilient porous material covering stall floor areas in a horse barn. A power reel and cable system retracts the belt onto a reel outside the enclosure removing accumulated waste material from the barn. The belt is repositioned by power take-up cables attached to its oppositely disposed free end.

DESCRIPTION OF THE DRAWINGS

FIG. 4 is an illustrative side elevational view of the removal system of the invention with portions broken away within the barn;

FIG. 7 is a graphic illustration overview of an alternate form of the invention;

FIG. 8 is an enlarged cross-sectional view of the belt attachment portion of the alternate form of the invention shown in FIG. 7;

DESCRIPTION OF THE PREFERRED EMBODIMENT

Figure 1:
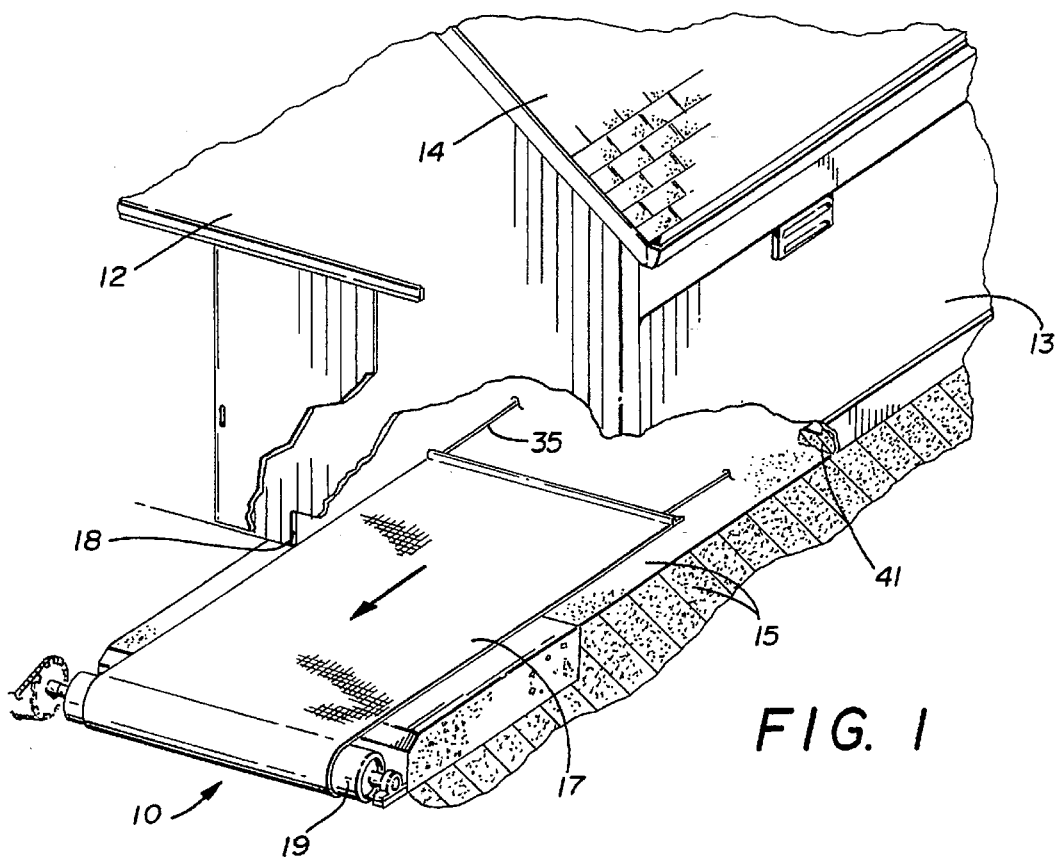
FIG. 1 is a partial perspective view of a barn building with the removal system of the invention within.

Referring to FIGS. 1–4 and 11 of the drawings a waste removal apparatus 10 can be seen positioned within a typical animal barn 11 having enclosure walls 12 and 13, a roof 14 and floor 15. The animal barn 11 has a plurality of animal stalls 16 within, best illustrated in FIG. 11 of the drawings. The waste removal apparatus 10 of the invention has a waste transfer belt 17 formed from a porous synthetic resin material that is positioned over the floor 15 in the animal stalls 16. The belt 17 extends the length of the barn 11 and is positioned so as to extend outwardly therefrom through an opening at 18 in the wall 12. The belt 17 is attached at one end to a take-up reel 19 by a belt attachment assembly 20, best seen in FIGS. 2, 3 and 5 of the drawings and described in greater detail hereinafter.

Figure 5:
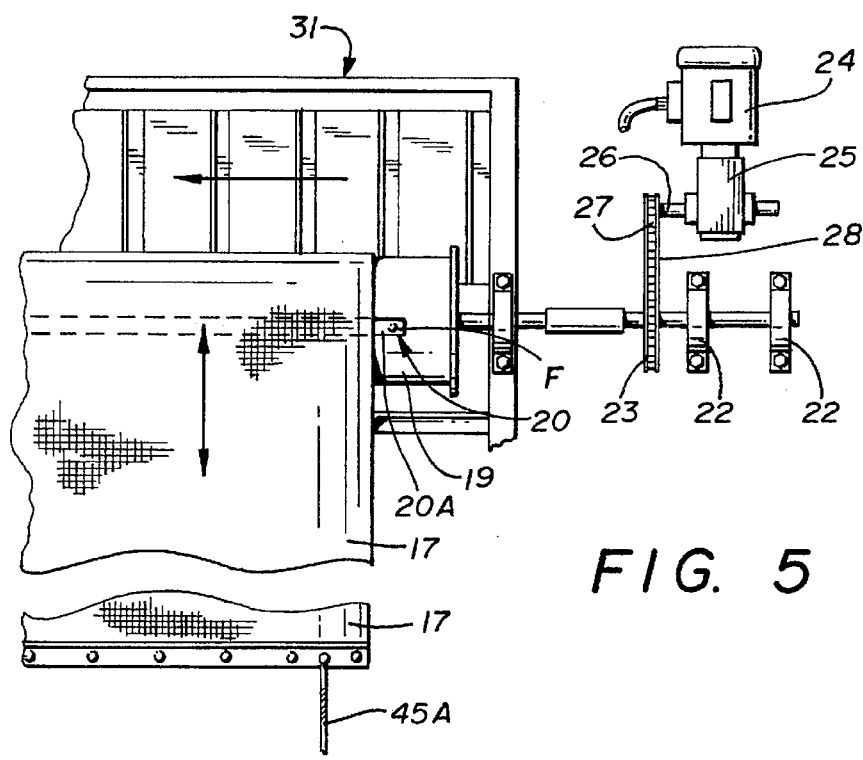
FIG. 5 is an enlarged top plan view of the drive system illustrated in FIG. 3.

The take-up reel 19 is rotatably positioned on a support shaft and drive assembly 21 having shaft engagement bearings 22 and drive sprocket 23 thereon. A motor 24 and drive gear reduction transfer case 25 having a drive shaft 26 and an attached sprocket 27 is interconnected to the reel drive sprocket 23 by a drive chain 28 as will be well understood by those skilled in the art as best seen in FIG. 5 of the drawings. The belt attachment assembly 20 has an apertured mounting bar 20A that overlaps the end of the belt 17 and secures same to the take-up reel 19 by multiple fasteners F extending therethrough.

The take-up reel 19 and drive assembly 21 are positioned below the horizontal plane of the belt 17 as it exits the animal building 11. A belt wiper blade assembly 30 is movably engaged against the belt 17 as it is wound up on the take-up reel 19 to assure that the material thereon is fully removed and deposited in a transfer conveyor belt chain unit 31 (generally indicated, as will be well known to those skilled in the art) therebelow. Belt wiper blade assembly 30 has an elongated resilient blade 32 and a support bracket 33 mounted to multiple spring loaded cylinder fittings 34 in spaced longitudinal relation to one another. The free end of the belt 17 is secured to a pair of cables 35 that extend from the animal barn 11 through respective cable guides 36 to cable receiving drums 37 mounted on the outside of the animal building 11 opposite said take-up reel 19. The take-up drums 37 are mounted on a drive shaft 38 extending therebetween with a cable motor and gear chuck assembly 39, best seen in FIG. 4 of the drawings attached thereto.

In operation, the belt 17 is initially positioned in the stalls 16 on which the animals (not shown) are kept. To clear the stalls 16 of waste product, the belt 17 is activated by the motor and gear assembly 21 so as to wind up the belt thereabout.

Figure 2:
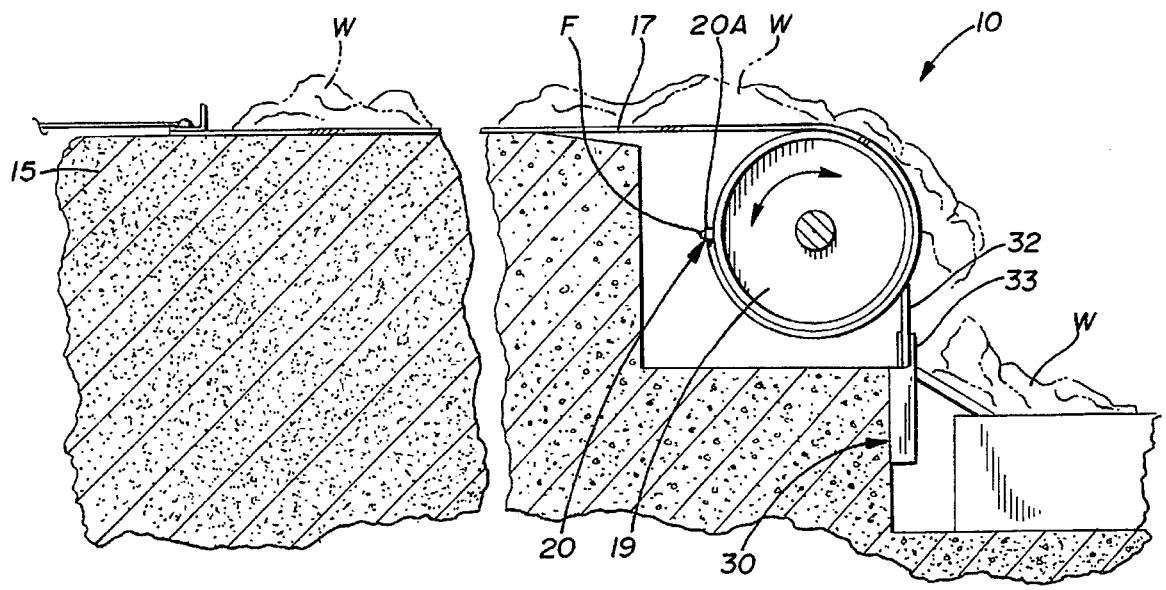
FIG. 2 is an enlarged partial illustration of the take-up portion of the removal system.
Figure 3:
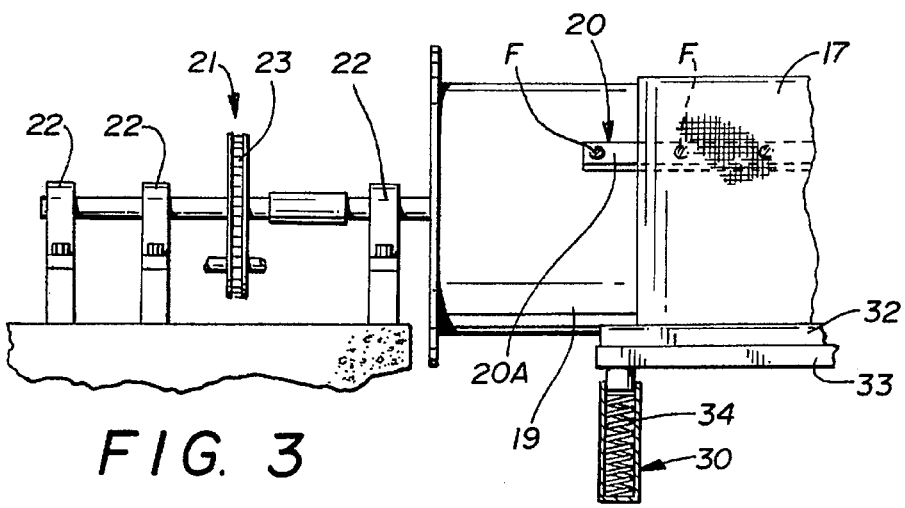
FIG. 3 is an enlarged partial front elevational view of the drive elements for the take-up reel with portions broken away.

As the waste material (W) is removed from the animal building 11 on the belt 17 it is disposed onto the belt chain transfer unit 31 shown in FIG. 2 of the drawings. The wiper blade assembly 30 completely removes the waste (W) from the belt 17 as it is wound up on the reel 19.

To reposition the belt 17 within the stall 16 from the take-up reel 19, the drive assembly 21 is disengaged and the cable motor and gear chuck assembly 39 is activated winding up the cables 35 pulling the belt 17 off the reel 19 and back into the animal barn 11 into the stalls 16 as will be well understood by those skilled in the art.

Figure 6:
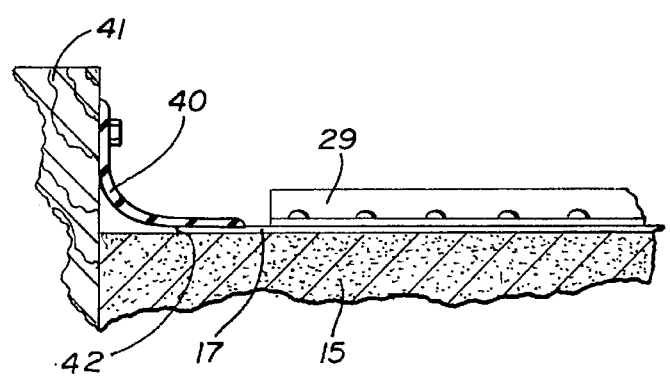
FIG. 6 is an enlarged partial cross-sectional view of the curb guard of the invention.

In FIG. 6 of the drawings, an elongated resilient curb shield 40 can be seen that extends from a curb wall area 41 overlapping an edge 42 of the belt 17 to provide a continuous edge transitionally therebetween.

Referring now to FIGS. 7 and 8 of the drawings, a first alternate form of the invention can be seen wherein an alternate barn configuration having a stall area 44 with an exerciser area 45 thereabout. Accordingly, the belt 17 is secured to the take-up reel 19 by cables 45A and 45B extending therefrom. Each cable has a belt engagement guide fitting 46 with intermediate links 47 engageable on a belt mounting angle 45C on the belt 17 as best seen in FIG. 8 of the drawings. The cables extend through respective slotted guide pipes 48 which extend below and across the exercise area 45.

The guide fittings 46 extend upwardly through the slotted pipes 48 allowing the belt 17 to be pulled across the exercise area 45 during belt activation. The cables 45A and 45B will not interfere with the exercise area 45 when the belt is repositioned within the stalls 16 since they will be enclosed within the buried slotted pipes 48 hereinbefore described.

Figure 9:
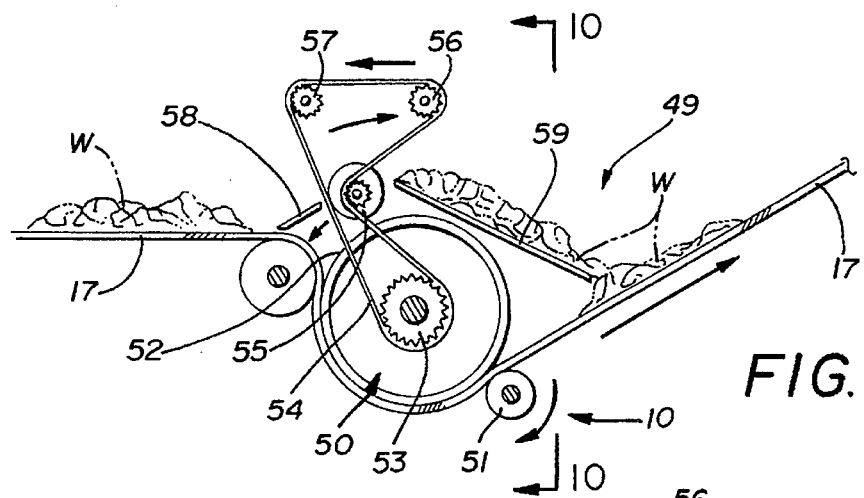
FIG. 9 is an enlarged side plan view illustrating the drive directions of a second alternate form of the invention with portions broken away.
Figure 10:
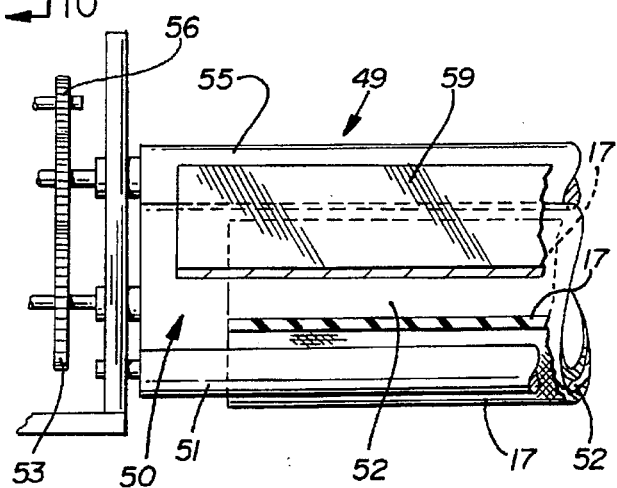
FIG. 10 is a partial cross-sectional view of the drive system on lines 10—10 of FIG. 9.
Figure 11:
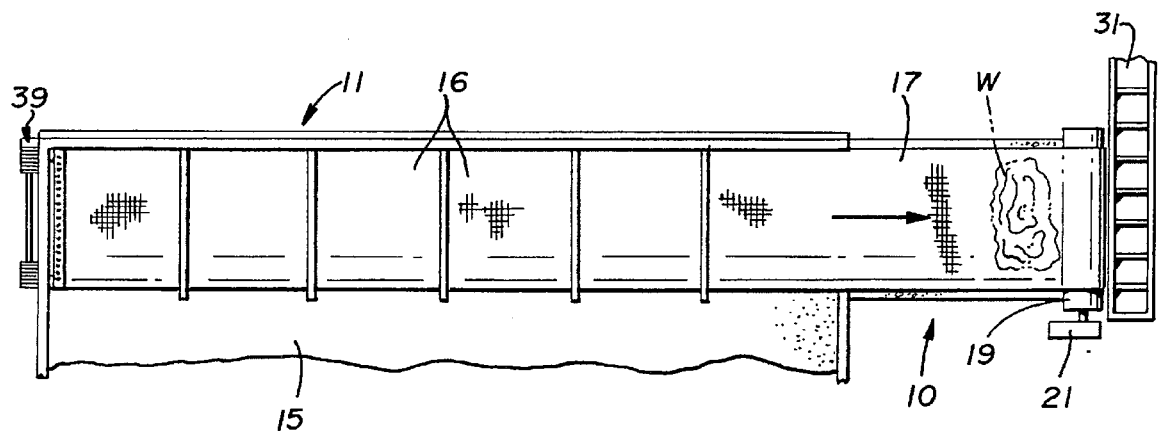
FIG. 11 is a graphic illustration overview of the removal system of the invention.
Figure 12:
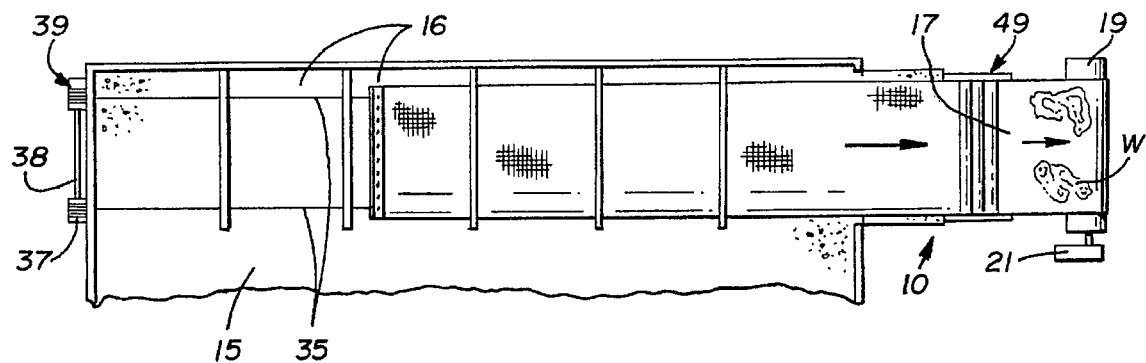
FIG. 12 is a graphic illustration overview of the alternate form of the invention set forth in FIGS. 9–10.

Referring now to FIGS. 9, 10 and 12 of the drawings, a second alternate form of the invention can be seen wherein an intermediate transfer assembly 49 is used to provide an angular inclination to the belt 17 after it has left the animal building 11. The intermediate transfer assembly 49 has drive engagement roller 50 extends transversely across the belt 17 and with an idler roller 51 allows for directional inclination from the horizontal plane as illustrated by the angle arrow in FIG. 10. The drive engagement roller 50 having a high friction rubberized surface 52 thereon is driven by the belt 17 as it passes thereunder.

A drive sprocket 53 on the end of the drive engagement roller 50 drives via a chain 54 a transfer roller 55 and with directional reversing idler sprockets 56 and 57 as will be well understood by those skilled in the art. A pair of elongated transfer platform plates 58 and 59 are independently positioned across the belt 17 in spaced relation thereto on either side of the transfer roller 55 to facilitate the waste (W) transfer over the drive engagement roller 50.

In use, the second alternate form of the invention as seen in FIG. 9 of the drawings the waste (W) is diverted onto the transfer plate 58 and adjacent transfer roller 55 from the upstream side of the belt 17 (during removal) emanating from the animal barn 11. The transfer roller 55 moves the waste thereover onto the transfer platform 59 which is inclined downwardly away from the transfer roller 55 and back onto the belt 17 downstream of the transfer point.

The belt 17 at this point is angled upwardly from the horizontal plane defined by the longitudinal axis of the drive engagement roller 50. By utilizing intermediate transfer roller assembly 49, the chain transfer conveyor 31 is not needed and the waste (W) can be removed directly from the belt 17 into an elevated wheeled vehicle such as a manure spreader (not shown).

Figure 13:
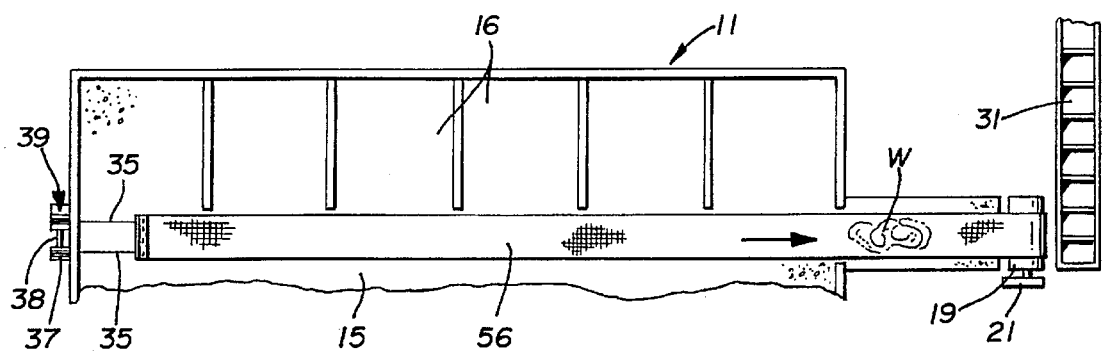
FIG. 13 is a graphic illustration overview of a second alternate form of the invention.

Referring now to FIG. 13 of the drawings, a third alternate form of the invention can be seen wherein a waste transfer belt 56 of a reduced transverse dimension is positioned just outside the stalls 16 allowing the removal of the waste material (W) by manually moving same onto the belt without removing the animals (not shown) from the stalls.

This form of the invention uses the same drive system as the hereinbefore described preferred form of the invention illustrated in FIGS. 1–6 and 11 of the drawings and as hereinbefore discussed.

It will thus be apparent to those skilled in the art that various changes and modifications may be made therein without departing from the spirit of the invention.

Therefore I claim:

1. An apparatus for use in removing manure from multiple animal stalls in a building said building having a floor, comprises; a collection belt within said stalls on top of said floor, said belt movable in either direction lengthwise thereof, said belt comprises of a synthetic resin porous material, a take-up reel engaging one end of said belt removing said belt and manure from said stalls, cable means extending from said free end of said belt for deploying said belt within said stall from said take-up reel, means for selective rotation of said take-up reel, means for cleaning said collection belt on said take-up reel, and means for collecting said manure from said collection belt.

2. The apparatus of claim 1 wherein said collection belt has an overall length greater than its width.

3. The apparatus of claim 2 wherein said belt is of a known transverse length equal to that of said animal stalls.

4. The apparatus of claim 1 wherein cable means extend from said belt comprise a pair of return cables, drive means on said cables for re-positioning said belt in said stalls.

5. The apparatus of claim 1 wherein said means for selective rotation of said reel comprises a drive motor interengaged to said take-up reel.

6. The apparatus set forth in claim 5 wherein said drive motor has a gear reduction means and a source of power.

7. The apparatus of claim 1 wherein said means for cleaning said collection belt comprises a wiper blade extending across said take-up reel.

8. The apparatus of claim 1 wherein said means for collecting said manure from said collection belt comprises a transfer conveyor independent of said apparatus.

9. The apparatus of claim 1 further comprises reel engagement cables secured to said belt, cable guide fittings on said cables, slotted guide pipes in said building for engagement of said guide fittings and intermediate means between said cable guides and said belt.

10. An apparatus for use in removing animal waste from multiple animal stalls in a building comprises; a collection and transportation belt within said stalls and intermediate transfer means engageable on said belt, a take-up reel extending from one end of said belt in a direction opposite of said transfer means in removal mode, cable means secured to said belt, a drive motor and gear assembly on said take-up reel, means for cleaning said belt on said take-up reel, said cable means extending from said belt for deploying said belt from said take-up reel.

11. The apparatus of claim 10 wherein said intermediate transfer means on said belt comprises a drive engagement roller, a transfer roller interconnected to said belt engagement roller by directional transfer means.

12. The apparatus of claim 10 wherein said cleaning means on said take-up reel comprises a wiper blade assembly extending across said belt on said reel.

13. The apparatus of claim 10 wherein said cable means secured to said belt comprises cables and power take-up drums on to which said cables are connected.

* * * * *